US006782195B2

(12) United States Patent
Abras et al.

(10) Patent No.: US 6,782,195 B2
(45) Date of Patent: Aug. 24, 2004

(54) HEAT EXCHANGER FOR HIGH PURITY FLUID HANDLING SYSTEMS

(75) Inventors: Alexei D. Abras, Livermore, CA (US); Saeed Taghipour, Danville, CA (US)

(73) Assignee: Applied Integrated Systems, Inc., Danville, CA (US)

( * ) Notice: Subject to any disclaimer, the term of this patent is extended or adjusted under 35 U.S.C. 154(b) by 47 days.

(21) Appl. No.: 10/116,721

(22) Filed: Apr. 3, 2002

(65) Prior Publication Data

US 2003/0188539 A1 Oct. 9, 2003

(51) Int. Cl.[7] .................................................. F24H 1/10
(52) U.S. Cl. ........................ 392/480; 392/484; 165/148
(58) Field of Search ................................ 392/480–485, 392/465, 466, 494; 165/148, 150, 168–171

(56) References Cited

U.S. PATENT DOCUMENTS

| 3,001,766 A | 9/1961 | Laist .............................. 257/1 |
| 3,212,274 A | 10/1965 | Eidus .............................. 62/3 |
| 3,448,798 A | 6/1969 | Coe ............................ 165/168 |
| 4,583,583 A | 4/1986 | Wittel, deceased .......... 165/46 |
| 4,989,626 A | 2/1991 | Takagi et al. ................. 137/13 |
| 5,561,981 A | 10/1996 | Quisenberry et al. ......... 62/3.7 |
| 5,899,077 A | 5/1999 | Wright et al. ................. 62/3.7 |
| 6,330,395 B1 * | 12/2001 | Wu ............................ 392/494 |

* cited by examiner

*Primary Examiner*—Thor Campbell
(74) *Attorney, Agent, or Firm*—Henneman & Saunders; Larry E. Henneman, Jr.

(57) ABSTRACT

A novel heat exchanger includes a thermal reservoir and a tube, the tube having straight sections and corrugated bends, and being in thermal contact with the thermal reservoir. The thermal reservoir has a first plate and a second plate fixed to the first plate. The first plate has a channel formed therein with straight sections to receive the straight sections of the tube, and curved sections for receiving the corrugated sections of the tube. The second plate has a channel formed therein as well that is complementary to the channel of the first plate. The heat exchanger is heated by one or more cartridge heaters. In a particular embodiment, two thermal reservoirs are fixed to one another and the cartridge heaters are disposed in channels formed therebetween. Optionally the thermal reservoirs can be heated or cooled by thermoelectric chips, and can include one or more heat sinks.

36 Claims, 9 Drawing Sheets

HEAT EXCHANGER FOR HIGH PURITY FLUID HANDLING SYSTEMS

BACKGROUND OF THE INVENTION

1. Field of the Invention

The present invention relates generally to heat exchanger devices, and more particularly to a compact heat exchanger with corrugated polymeric tubing for use with high purity and/or corrosive fluids.

2. Description of the Background Art

Many industries require the use of heat exchangers to regulate the temperature of high purity and/or corrosive fluids. For example, microchip fabrication within the semiconductor industry requires heating and temperature regulation of the etching solutions used to etch silicon wafers and microcircuit lines. Because both the process temperatures and the heat capacities of the etching fluids are relatively high, a rather large amount of heat is required to raise and maintain the temperatures of the etchants.

Additionally, etching fluids must be free of foreign particles in order to avoid the contamination and destruction of microcircuits formed in the silicon wafers. Therefore, because etching chemicals, such as hydrofluoric acid, are harsh and corrosive, the etching fluid must not come in contact with any portion of the heat exchanger which could corrode and/or dissolve, thereby introducing contaminants into the etchant.

Attempts have been made to overcome these limitations. For example, thermally conductive oil or grease is often placed between the tube and heat exchanger. Additionally, coiled inserts are sometimes placed within the tube (see e.g., U.S. Pat. No. 5,899,077 to Wright, et al.). While the turbulence caused by the inserts facilitates increased thermal transfer between the heat exchanger and the fluid, the inserts also cause "dead zones" within the fluid flow, increasing the potential for particle build-up and contamination of the etching fluid.

In addition, it is also hard to form tight bends in known tubing materials. This creates several problems when designing and manufacturing heat exchangers, wherein tubing typically includes multiple bends. First, known inert tubing is easily kinked, and cannot therefore be bent with small diameter bends. Rather, such tubing requires a large bend radius, and is therefore often bent outside of the heat exchanger, thereby reducing the heating efficiency of the heat exchanger. Further, as the wall thickness of the tubing decreases, the required bend radius increases. Alternately, if the tubing is entirely retained within the heat exchanger, a complex curved channel with large bend radii must be machined into the heat exchanger plating. In either situation, because of the large bend radii of plastic tubing, less tubing can be used per unit surface area of the heat exchanger, thereby reducing the thermal efficiency of the heat exchanger.

What is needed, therefore, is a heat exchanger that utilizes tubing that can withstand high working temperatures without rupturing or becoming diffusive. What is also needed is a heat exchanger that improves thermal conductivity between the tube and the heat exchanger, while remaining compact, highly expandable, inexpensive to produce, and easy to maintain.

SUMMARY

The present invention overcomes the problems associated with the prior art by providing a novel heat-exchanging device. The invention facilitates high temperature heating of high-purity and/or corrosive fluids by utilizing temperature resistant tubing having corrugated bends formed therein. The unit is compact, inexpensive, expandable, and easy to maintain.

The disclosed particular embodiments of the heat exchanger include at least one thermal reservoir and a tube in thermal contact with the thermal reservoir that has corrugated bends. The tube is formed from a chemically inert material (e.g., perfluoroalkoxy (PFA) plastic), and has relatively high working temperatures (e.g., exceeding 250 degrees Celsius). In the disclosed embodiments, the tube has a plurality of straight sections and a plurality of corrugated sections.

In a particular embodiment, the thermal reservoir includes at least one plate having a channel formed therein to receive the tube. The channel has straight sections and curved sections, in which to receive the straight and corrugated sections of the tube, respectively. The straight sections of the channel (and thus the tube) are arranged parallel to one another, wherein the spacing between consecutive straight sections is less than or equal to twice the diameter of the tube. The curved sections of the channel within the plate have a wider diameter than the straight sections in order to accommodate the corrugated bends of the tube. In a more particular embodiment, the thermal reservoir includes a second plate, having a complementary channel to the channel formed in the first plate. The second plate is fixed to the first plate. In another particular embodiment, the heat exchanger comprises multiple thermal reservoirs fixed together, and is capable of simultaneously heating multiple fluids and/or additionally heating a single fluid. In a particular embodiment, the fluid conduction tube passing through a first thermal reservoir is connected to the fluid conduction tube passing through a second thermal reservoir.

The thermal reservoir(s) of the various heat exchangers are heated and/or cooled in a variety of ways. In a particular embodiment, at least one heater is secured to the thermal reservoir(s). In a more particular embodiment, the heater is a cartridge heater disposed in or between one or more plates or thermal reservoirs of the heat exchanger. In an alternate embodiment, thermoelectric chips are coupled to the outside of one or more thermal reservoirs. Optionally, a heat sink can be secured to the thermal reservoir to prevent the thermoelectric chips from overheating, as well as, to regulate the temperature within the thermal reservoir.

The fluid conduction tubes of the heat exchange sub-units can be configured in a variety of arrangements. For example, the tubes of adjacent heat exchange sub-units can be connected in series or in parallel. Indeed, the heat exchange sub-units of an expanded heat exchanger can be configured in any combination of in series or in parallel groups.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a novel heat exchanger that utilizes temperature resistant, corrugated tubing to improve heat transfer between the heat exchanger and fluid, while simultaneously remaining compact, inexpensive, and easy to maintain. As used herein, "corrugated tubing" is understood to include tubing having convoluted sections formed therein. In the following description, numerous specific details are set forth (e.g., particular heat sinks, particular types of heating/cooling devices, particular fasteners, etc.) in order to provide a thorough understanding of the invention. Those skilled in the art will recognize, however, that the invention may be practiced apart from these specific details. In other instances, details of well-known fluid handling practices (e.g., supply and return pipe routing, electrical routing and control, heat exchanger mounting methods, etc.) and components have been omitted, so as not to unnecessarily obscure the present invention.

Figure 1A:
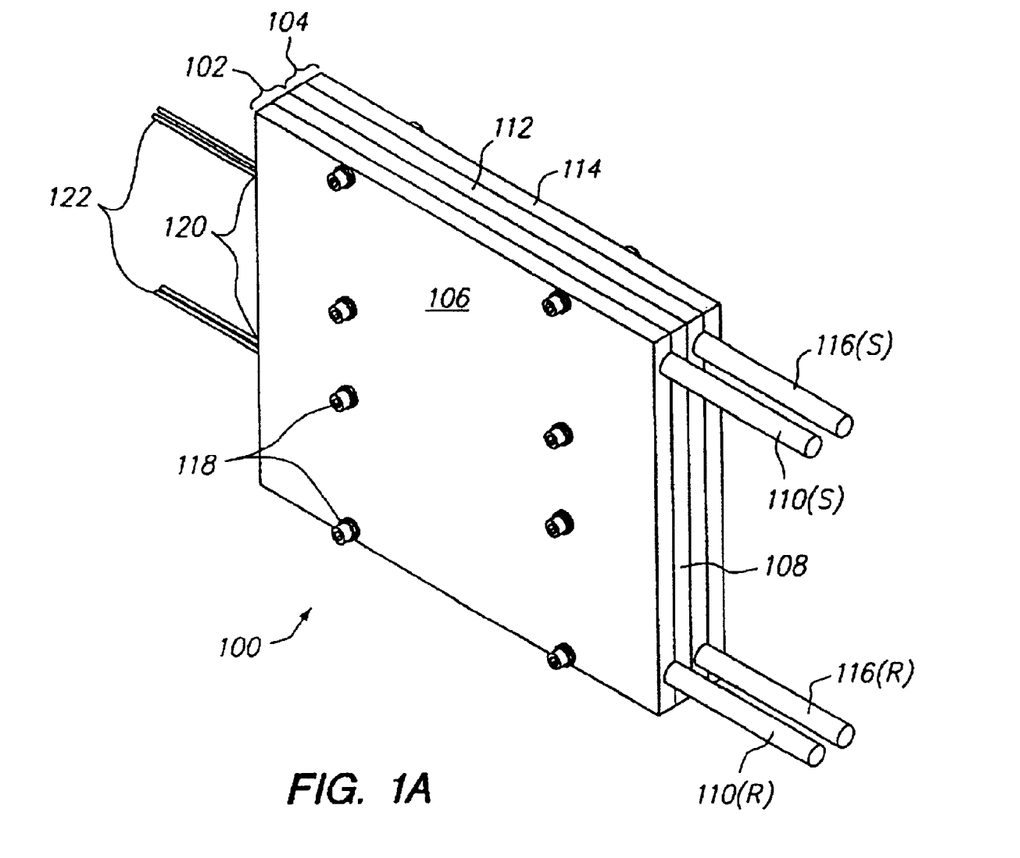
FIG. 1A is a front perspective view of the heat exchanger of the present invention.

FIG. 1A is a front perspective view of a heat exchanger 100. Heat exchanger 100 includes a first thermal reservoir 102, and a second thermal reservoir 104. Thermal reservoir 102 includes a first plate 106 and a second plate 108. A fluid conduction tube 110 is interposed between first plate 106 and second plate 108. A fluid (e.g. the fluid to be heated and/or cooled) enters tube 110 through a supply end 110(S), and exits tube 110, through a return end 110(R). Similarly, second thermal reservoir 104 includes a third plate 112 and a fourth plate 114. A second fluid conduction tube 116 interposed between third plate 112 and fourth plate 114. Fluid enters tube 116 through a supply end 116(S), and exits through a return end 116(R). Plates 106, 108, 112, and 114 are held together by a plurality of fasteners 118.

Note that heat exchanger 100 actually includes two separate heat exchangers. In particular, thermal reservoir 102 and tube 110 form one heat exchanger sub-unit, and thermal reservoir 104 and tube 116 form another heat exchanger sub-unit. However, because first thermal reservoir 102 and second thermal reservoir 104 are in thermal contact with one another, they can be considered a single thermal reservoir. Accordingly, while in this embodiment heat exchanger 100 includes two heat exchanger sub-units, it should be understood that a greater or lesser number of iterations of heat exchanger sub-units may be employed.

A plurality of cartridge heaters 120, each having a pair of electrical leads 122 (portion shown), heat first thermal reservoir 102 and second thermal reservoir 104. In this particular embodiment, cartridge heaters 120 are interposed between thermal reservoir 102 and second thermal reservoir 104 (i.e., between plates 108 and 112). It should be understood, however, that cartridge heaters 120 may be disposed elsewhere (e.g., between plates 106 and 108, between plates 112 and 114, etc.).

Heat exchanger 100 operates as follows. When electrical power is supplied to electrical leads 122, cartridge heaters 120 supply thermal energy (heat) to thermal reservoirs 102 and 104, heating plates 106, 108, 112, and 114 to a predetermined temperature. An electronic controller (not shown) responsive to a thermal sensor (not shown) controls the flow of electrical current to cartridge heaters 120, to maintain thermal reservoirs 102 and 104 at the desired temperature. Thermal energy from reservoirs 102 and 104 is then transferred to a fluid (e.g. hydrofluoric acid) as it travels through tubes 110 and 116 from their respective supply ends 110(S), 116(S) to their respective return ends 110(R), 116(R).

Figure 1B:
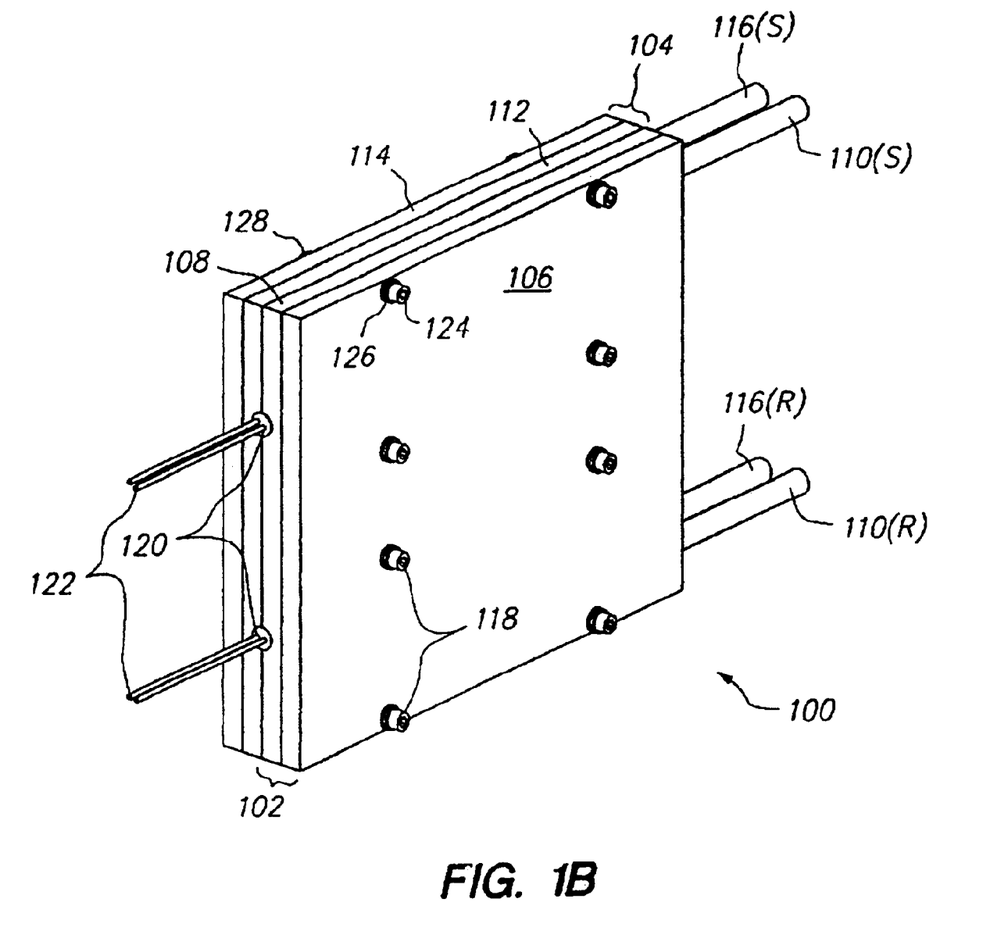
FIG. 1B is a rear perspective view of the heat exchanger of FIG. 1A.

FIG. 1B is a rear perspective view of heat exchanger 100. In FIG. 1B cartridge heaters 120 more clearly shown as round inserts interposed (i.e. in a bore, channel, etc.) between second plate 108 and third plate 112. Such positioning of cartridge heaters 120 ensures optimal, even heating of thermal reservoir 102 and second thermal reservoir 104, as well as, easy access to cartridge heaters 120 and electrical leads 122 for replacement or service. Further, placing cartridge heaters 120 between plates 108 and 112 eliminates the concern over interference between cartridge heaters 120 and tubes 110 and 116 (which are disposed between plates 106 and 108 and plates 112 and 114, respectively), as will be apparent from the description that follows.

Each fastener 118 includes a hex-head bolt 124, a lockwasher 126, and a standard hex-nut 128. Such fasteners are common within industry, and facilitate simple breakdown of the components of the heat exchanger for service and replacement, as well as, ensuring that heat exchanger 100 will remain reliably secure during operation. If additional iterations of heat exchange sub-units are employed, hex-head bolts 124 are simply replaced with longer hex-head bolts, depending on the resulting overall width of heat exchanger 100.

Figure 2:
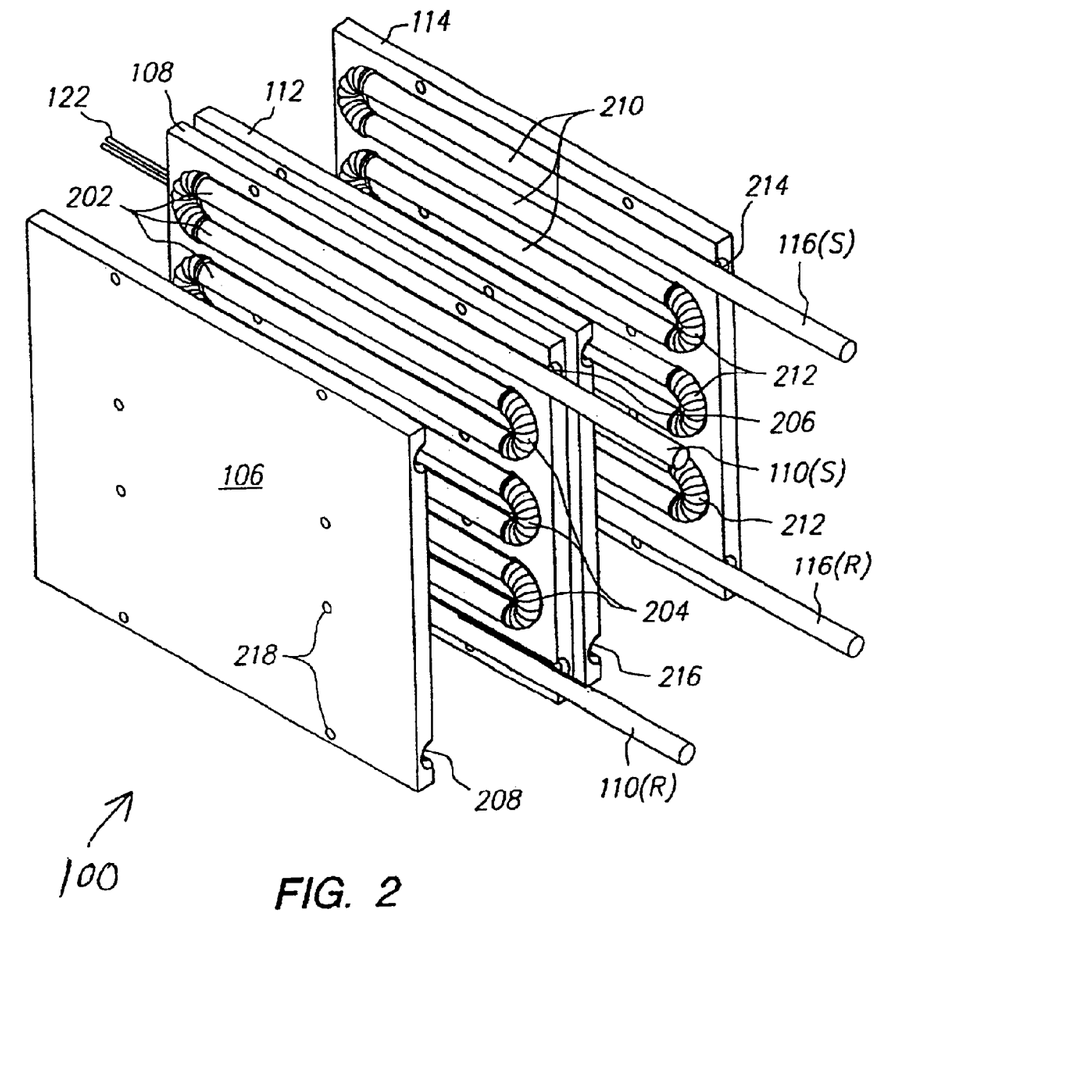
FIG. 2 is an exploded view of the heat exchanger of FIG. 1A.

FIG. 2 is an exploded view of heat exchanger 100, showing tube 110 to include a plurality of straight sections 202 and a plurality of corrugated sections 204. Second plate 108 includes a channel 206, formed to accept tube 110 therein. First plate 106 also includes a channel 208 that is complementary to channel 206, such that channels 206 and 208 receive tube 110 when heat exchanger 100 is assembled. Similarly, second tube 116 includes a plurality of straight sections 210 and a plurality of corrugated sections 212. Fourth plate 114 includes a channel 214, and third plate 112 includes a complementary channel 216, which together receive tube 116 between third plate 112 and fourth plate 114. Fasteners 118 are omitted from the view of FIG. 2, so as not to unnecessarily obscure the other features shown therein. It should be understood, however, that heat exchanger 100 is held together by fasteners 118 through bolt holes 218 of plates 106, 108, 112, and 114.

The structure and configuration of tube 110 provides several advantages. Corrugated sections 204 of tube 110 permit tube 110 to bend in a variety of directions and/or angles. In the present embodiment, corrugated sections 204 are bent through an angle of 180 degrees to situate straight sections 202 parallel to one another. In addition, corrugated sections 204 of tube 110 permit bend radii smaller than that previously available in heat exchangers. In this particular embodiment, the bend radius of tube 110 is less than or equal to twice the diameter of straight section 202 of tube 110 (i.e., ≦a 2D bend), approximately one and a half times the diameter of the straight sections 202 (≅a 1.5D bend). Additionally, corrugated sections 204 permit tube 110 to be bent easily and without kinking. The tight bends of tube 110 ensure efficient use of the surface area of each of the plates (e.g. plate 108) of heat exchanger 100, thus facilitating a compact design, as well as, increased heat transfer to the fluid within tube 110. Further, the corrugated sections 204 introduce turbulence into the fluid passing through tube 110, thereby increasing thermal transfer between the fluid and plates 106 and 108. It is therefore not necessary to place turbulence inducing objects inside tube 110, as in some prior art applications. Tube 116 is substantially similar to tube 110, and is positioned between third plate 112 and fourth plate 114 in the same manner as tube 110 is oriented between first plate 106 and second plate 108. The addition of thermally conductive grease (not shown) between tubes 110 and 116 and their respective plates 106 and 108, and plates 112 and 114, also improves thermal transfer even further.

Figure 3:
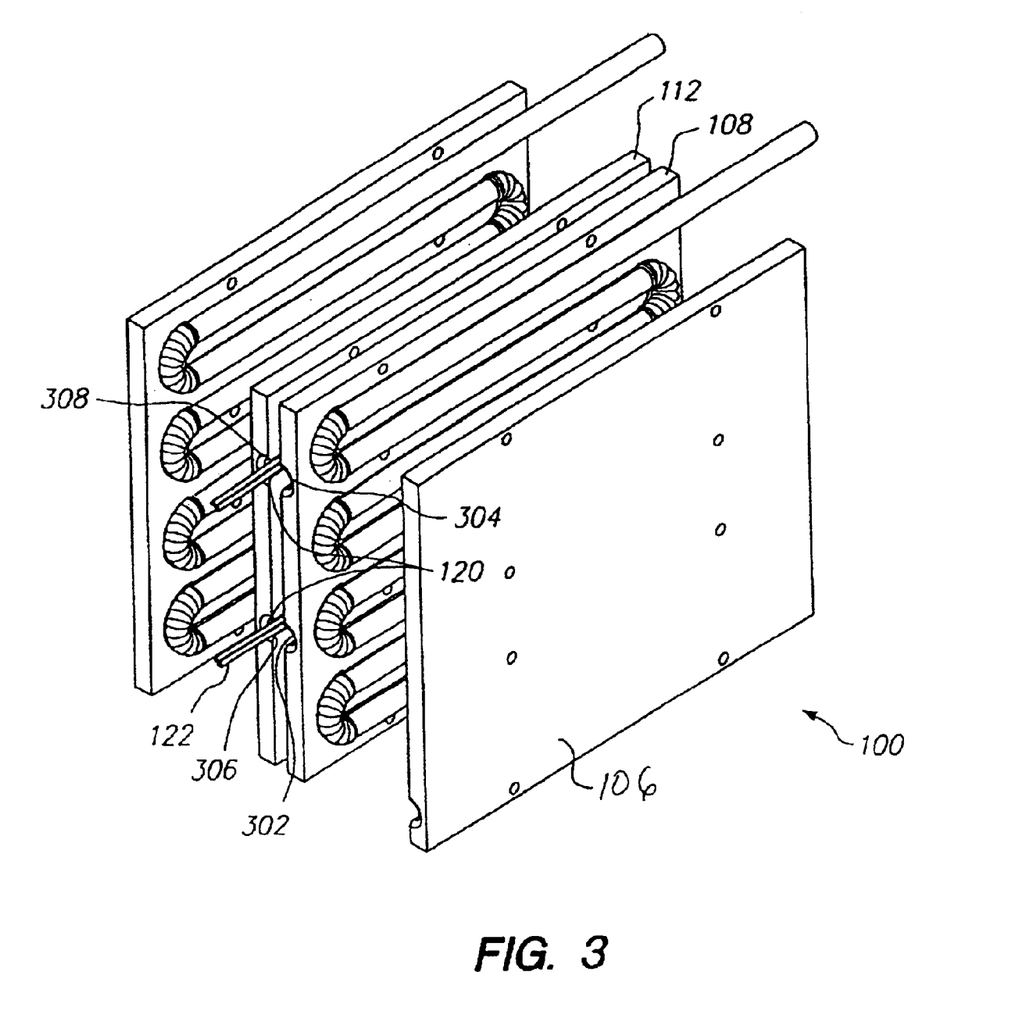
FIG. 3 is another exploded view of the heat exchanger of FIG. 1A.

FIG. 3 is a rear perspective, partially exploded view of heat exchanger 100. As shown in FIG. 3, second plate 108 further includes hemi-cylindrical heater channels 302 and 304. Third plate 112 also includes a pair of hemi-cylindrical heater channels 306 and 308. Heater channels 306 and 308 are complementary to heater channels 302 and 304, respectively, of second plate 108. Additionally, cartridge heaters are shown cylindrical in the current view. When heat exchanger 100 is assembled, heater channel 302 and complementary heater channel 306 form a cylindrical cavity, as do heater channels 304 and 308. Cartridge heaters 120 can each be slid into and out of the cylindrical cavities. Cartridge heaters 120 are retained within respective heater channels (e.g. heater channels 302 and 306) by frictional force, which can be easily overcome to replace the cartridge heaters. Optionally, the frictional forces retaining cartridge heaters 120 can be increased/decreased by tightening/loosening fasteners 118 (FIGS. 1A–1B).

It should be noted that second plate 108 of thermal reservoir 102, and third plate 112 of second thermal reservoir 104 could be embodied in a single plate. Heater channels 302 and 306, as well as heater channels 304 and 308 would then comprise a bore machined into the middle of the single plate to accept one of cartridge heaters 120.

From the present figure, it is readily apparent that heat exchanger 100 is quick and simple to assemble, as well as, highly expandable. The assembly process begins when tube 110 is placed (optionally with thermally conductive grease) in either channel 206 of second plate 108, or in channel 208 of first plate 106. Plates 106 and 108 are then fit together to form thermal reservoir 102. Second thermal reservoir 104 is assembled in a similar manner. Plates 106, 108, 112, and 114 are then mounted together with fasteners 118 (FIGS. 1A–1B). Then, cartridge heaters 120 are inserted in the recesses formed by the combination of heater channels 302 and 306, and heater channels 304 and 308.

Heat exchanger 100 is highly expandable. The present embodiment contains only thermal reservoirs 102 and 104, however, heat exchanger 100 can be expanded to heat more fluid by coupling further thermal reservoirs to heat exchanger 100. The only modifications required would be the installment of additional heater cartridges 120 in thermal contact with the added thermal reservoir(s), and the use of longer versions of fasteners 118 (not shown) to secure the assembly together.

The expanded heat exchanger can be configured in many different ways. For example, the heat exchanger can be used to heat several different fluids in parallel. Alternatively, the fluid output of each heat exchanger sub-unit can be coupled in series to the input of another sub-unit, such that the fluid being heated can pass through multiple heat exchanger sub-units to provide a greater amount of heating. Further, any combination of the above-described parallel and series configurations can be employed.

Figure 4A:
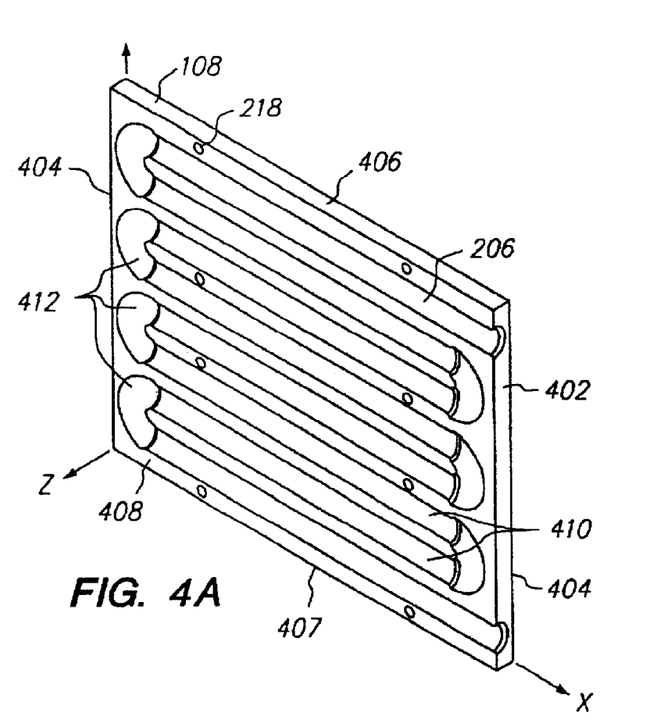
FIG. 4A is a perspective view of a thermal plate of the heat exchanger of FIG. 1A.

FIG. 4A is a side perspective view of second plate 108 of heat exchanger 100. Plate 108 is shown to be generally rectangular, with a front wall 402, a rear wall 404, a top 406, a bottom 407, a first face 408 and an opposite face 409 (FIG. 4B), all of which are also generally rectangular. Channel 206 is formed in first face 408, and includes a plurality of hemi-cylindrical straight sections 410 and a plurality of hemi-cylindrical curved sections 412 to receive tube 110. Channel 206 begins and ends at front wall 402 (i.e. where supply end 110(S) and return end 110(R) of tube 110 enter and exit). Straight sections 410 are arranged parallel to one another and are joined by 180 degree curved sections 412. The diameter of curved sections 412 is slightly greater than the diameter of straight sections 410, to accommodate the larger diameter of corrugated sections 204 of tube 110.

The disclosed configuration of channel 206 is compact and efficient. The distance between each parallel straight section 410 is less than or equal to twice the diameter of straight section 410 of channel 206 (approximately 1–1.5 D in this particular embodiment). The close spacing of straight sections 410 permits more efficient heat transfer between plate 108 and tube 110, and results in a more compact heat exchanger. It should be understood, however, that the orientation of straight sections 410 and curved sections 412 can be varied without departing from the scope of the invention.

Plate 108 is simple to manufacture, and therefore, is cost effective. Plate 108, is formed from a thermally conductive, corrosion resistant metal such as aluminum. Channel 206 can be formed in plate 108 by numerous methods. For example, plate 108 and channel 206 might be cast using a mold. Alternately, if plate 108 is machined from a piece of metal stock, channel 206 can be formed using machining operations (i.e. milling) well known to those skilled in the art. Openings 218 can be easily formed by a simple drilling operation.

Figure 4B:
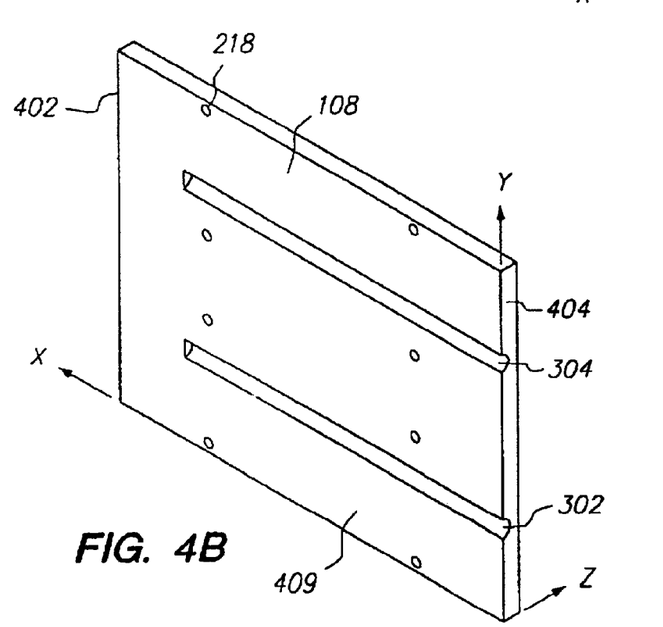
FIG. 4B is a perspective view showing an opposite side of the thermal plate of FIG. 4A.

FIG. 4B is an opposite side perspective view of plate 108, showing heater channels 302 and 304 formed in opposite face 409. Channels 302 and 304 are shown to be hemi-cylindrical and extend about three-quarters the length of plate 108. The diameter of channels 302 and 304 will vary depending on the characteristics of the heater cartridge to be employed. Heater channels 302 and 304 can also be easily machined into plate 108 during manufacture, or formed during a casting process of plate 108.

The symmetrical configuration of plate 108 provides another important advantage. In particular, an expanded heat exchanger can be assembled using multiple iterations of plate 108. Although the outer plates 106 and 114 of heat exchanger 100 are different than inner plates 108 and 112, it should be recognized that heat exchanger 100 can be assembled from four identical copies of plate 108, thus reducing the number of different parts that must be manufactured to produce heat exchanger 100. This feature also eliminates the need to remove and/or reposition outer plates during expansion of heat exchanger 100.

Figure 5A:
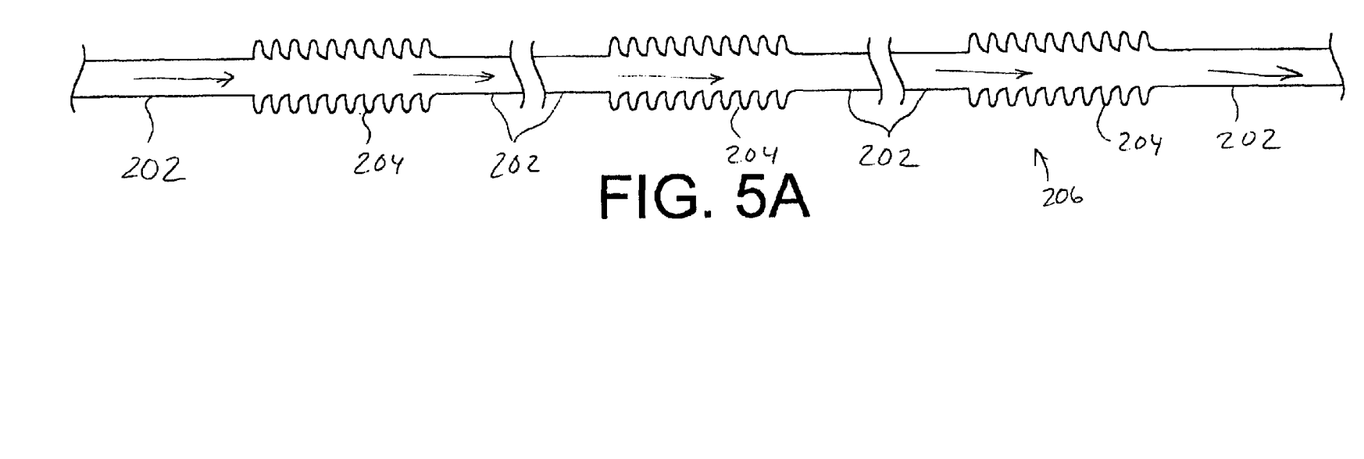
FIG. 5A shows a section of a tube suitable for use with the heat exchanger of the present invention.

FIG. 5A is a diagrammatic representation of a section of tube 110, shown to include a plurality of straight sections 202 and a plurality of corrugated sections 204. Corrugated sections 204 have a slightly larger outer diameter than straight sections 202. Tube 110 can be manufactured with straight sections 202 and corrugated sections 204 of any length depending on the particular application. Fluid flow through tube 110 is indicated by the direction of the arrows in the drawing in order to prevent a backpressure from forming within the tube and impeding fluid flow. This direction of fluid flow is preferred in order to reduce the formation of stagnant regions of fluid within corrugated sections 204 of tube 110.

Corrugated sections 204 provide many advantages over the prior art tubing. First, corrugated sections 204 cause the fluid passing therethrough to become increasingly turbulent. By increasing the turbulence of the fluid, heat is more efficiently transferred to or from the fluid.

Figure 5B:
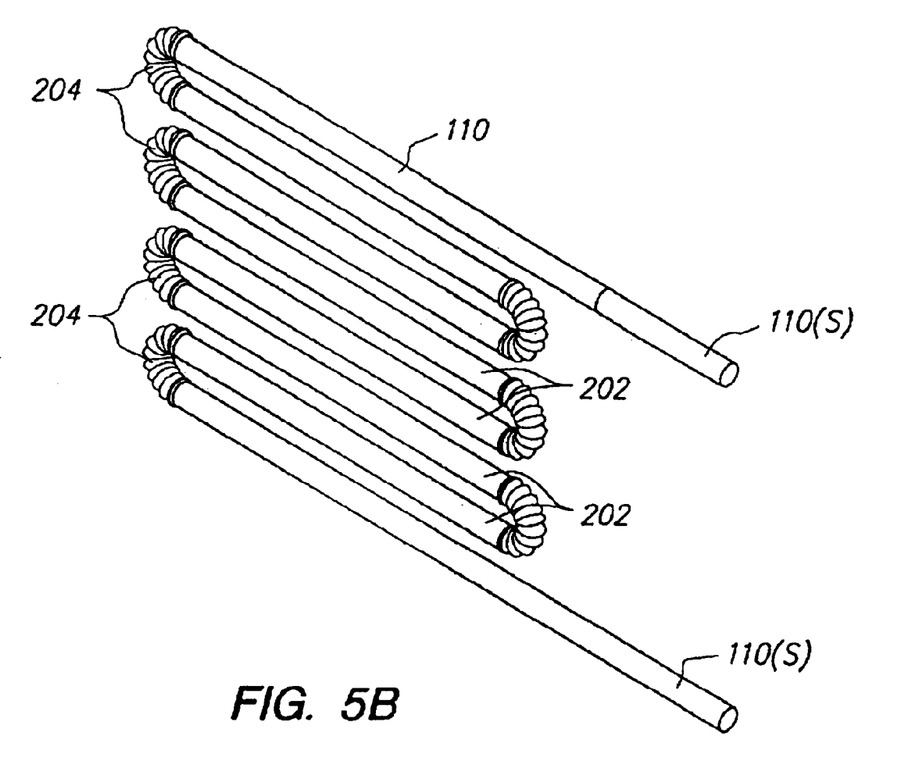
FIG. 5B shows a perspective view of the tube of FIG. 5A bent into shape as implemented in one embodiment of the present invention.

FIG. 5B is a perspective view of tube 110, clearly showing parallel straight sections 202, as well as corrugated sections 204. Note that the bend radius of corrugated sections 204 is less that or equal to twice the diameter of straight sections 202 of tube 110.

Tube 110, as well as tube 116, is formed from a perfluoroalkoxy (PFA) plastic having a 0.03" wall thickness. PFA plastic is temperature resistant to 250 degrees Celsius, making it suitable for high-temperature transfer processes such as within the semiconductor industry. Further, PFA plastic is chemically inert and readily available in industry. For example, the tubing for this embodiment was custom manufactured, according to the inventors' specifications, by Texloc, Ltd. of Fort Worth, Tex.

Figure 6:
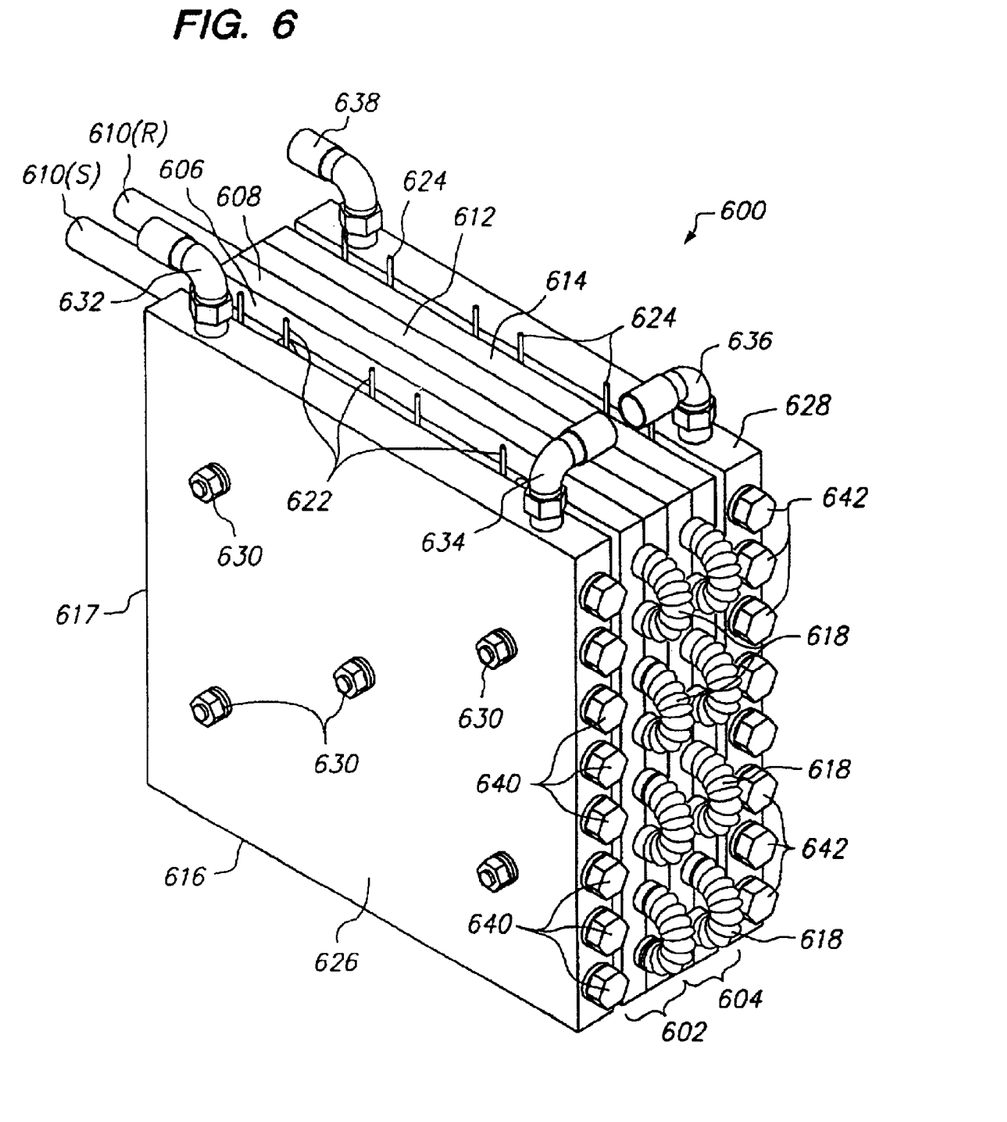
FIG. 6 shows a perspective view of another embodiment of a heat exchanger of the present invention

FIG. 6 shows an alternate heat exchanger 600, according to another embodiment of the present invention, that is capable of both heating and cooling. Heat exchanger 600 includes a first thermal reservoir 602, and a second thermal reservoir 604. Thermal reservoir 602 includes a first plate 606 a second plate 608 A fluid conduction tube 610 is disposed in channels formed between plates 606 and 608. Second thermal reservoir 604 includes a third plate 612 and a fourth plate 614, which also have tube receiving channels formed therebetween. Near the base 616 and rear 617 of heat exchanger 600, tube 610 exits thermal reservoir 602, bends, and enters second thermal reservoir 604 (FIG. 7B). Fluid enters heat exchanger 600 at a supply end 610(S) of tube 610, and exits at the return end 610(R) of tube 610. Tube 610 comprises straight sections (not visible), as well as, exposed corrugated sections 618. Corrugated sections 618 facilitate bending of tube 610. Optionally, second plate 608 and third plate 612 can be formed as a single plate.

Heat exchanger 600 also includes a first plurality of thermoelectric chips 622 (only the electrical leads are visible in FIG. 6) thermally coupled to the outside of first plate 606 of thermal reservoir 602. A second plurality of thermoelectric chips 624 (only the electrical leads 624 are shown) is coupled to the outside of fourth plate 614 of thermal reservoir 604. Thermoelectric chips 622 and 624 are fixed to their respective plates by fasteners 630. Thermally conductive grease may be used to enhance thermal conduction between thermoelectric chips 622 and 624 and their respective plates.

Heat exchanger 600 further includes a first heat sink 626, a second heat sink 628, and a plurality of fasteners 630 that hold heat exchanger 600 together. Heat sink 626 is coupled to the outside of thermoelectric chips 622, while second heat sink 628 is coupled to the outside of second plurality of thermoelectric chips 624. Heat sinks 626 and 628 are retained in position by fasteners 630.

When powered, thermoelectric chips 622 and 624 transfer thermal energy between thermal reservoirs 602 and 604, and heat sinks 626 and 628, respectively. Heat sinks 626 and 628 remove heat transferred by thermoelectric chips 622 and 624 during operation. In the present embodiment, heat sinks 626 and 628 comprise fluid (e.g. water, ethylene glycol solution, etc.) filled vessels. Fluid circulates through heat sink 626 by entering heat sink 626 via fluid inlet port 632, and exiting through fluid outlet port 634. Similarly, fluid enters second heat sink 628 via fluid inlet port 636 and exits via fluid outlet port 638. Optionally, fluid outlet port 634 of heat sink 626 may be connected to fluid inlet port 636 of heat sink 628 in order to simplify the fluid flow process between the cooling fluid supply (not shown) and heat sinks 626 and 628. Heat sinks 626 and 628 include a plurality of plugs 640 and 642, respectively. Removal of plugs 626 and 628 facilitates the draining and/or cleaning of heat sinks 626 and 628. Additionally, the selective removal of one or more of plugs 640 and/or 642 provides additional ports that can be used to couple additional fluid supplies to heat sinks 626 and 628, when additional thermal transfer capacity is required. Other details of heat sinks 626 and 628 are not considered to be an aspect of the present invention, and are not, therefore, discussed in detail. Indeed, alternate heat sinks may be substituted for heat sinks 626 and 628.

Heat exchanger 600 operates as follows. When electric current is applied to thermoelectric chips 622 and 624 in a first direction, thermoelectric chips 622 and 624 heat respective thermal reservoirs 602 and 604. The electrical current is controlled to maintain thermal reservoirs 602 and 604 within a predetermined temperature range. Process fluid enters thermal reservoir 602 at the supply end 610(S) of tube 610, collects heat as it travels through thermal reservoirs 602 and 604, and exits at the return end 610(R) of tube 610 at an increased temperature. Optionally, additional heaters (i.e. cartridge heaters) can be used to further heat thermal reservoirs 102 and 104.

When electric current is applied to thermoelectric chips 622 and 624 in a second, opposite direction, thermoelectric chips 622 and 624 transfer heat from thermal reservoirs 602 and 604 to heat sinks 626 and 628, respectively, thereby lowering the temperature of thermal reservoirs 602 and 604. The amount of electrical current provided is controlled to maintain thermal reservoirs 602 and 604 within a relatively lower temperature range. As process fluid flows through tube 610, heat passes from the process fluid into thermal reservoirs 602 and 604, thereby cooling the process fluid. Cooling fluid flows through heat sinks 626 and 628 to remove heat transferred from thermal reservoirs 602 and 604 to heat sinks 626 and 628 by thermoelectric chips 622 and 624.

Heat exchanger 600 can be further expanded by attaching a third thermal reservoir to the outside of either heat sink 626 or heat sink 628. A third plurality of thermoelectric chips would be interposed between heat sink 626 or 628 and the additional thermal reservoir. Longer, versions of bolts 630 would also be required to retain the assembly together. Further thermal reservoirs and/or heat sinks could be added depending on the particular application.

Figure 7A:
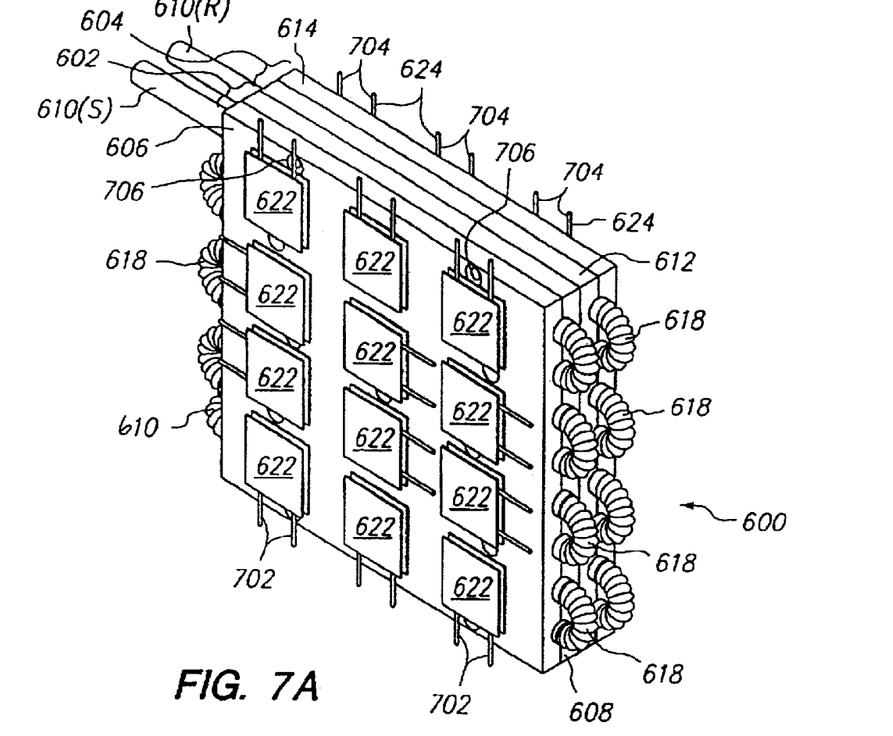
FIG. 7A is a perspective view of the heat exchanger of FIG. 6 with outer heat sinks removed therefrom.
Figure 7B:
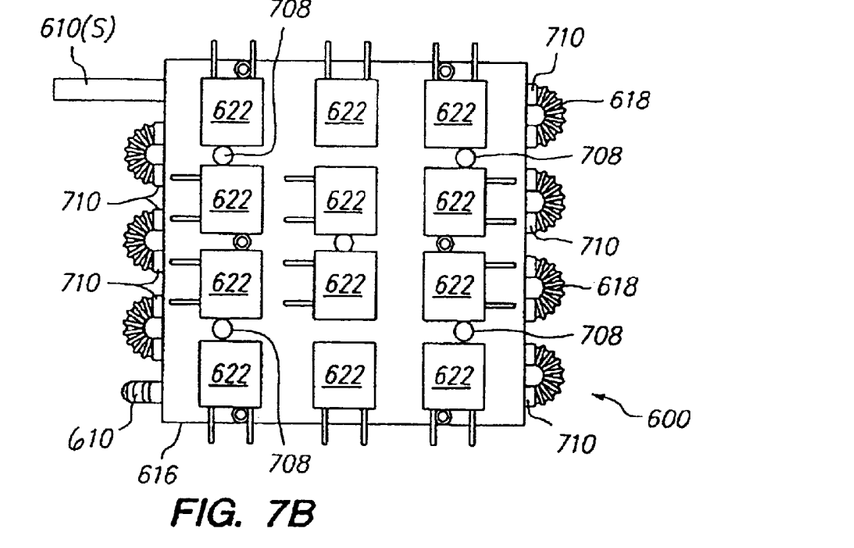
FIG. 7B is a side view of the heat exchanger of FIG. 6 with the outer heat sinks removed.

FIG. 7A is a perspective view of heat exchanger 600 having heat sink 626 and second heat sink 628 removed. Thermoelectric chips 622 can be clearly seen fixed to first plate 606. Second plurality of thermoelectric chips 624 are fixed to fourth plate 614 in the same arrangement, but are not visible in the view of FIG. 7A. A pair of electrical leads 702 supply each thermoelectric chip 622. Similarly, a pair of electrical leads 704 supply each of thermoelectric chips 624. In fact, thermoelectric chips 622 and 624 are substantially identical in structure and function. In this particular embodiment, thermoelectric chips 622 and 624 are devices available from Melcor Corporation of Trenton, N.J.

A plurality of fasteners 706 couple plates 606, 608, 612, and 614 together. Plate 606 and fourth plate 614 are counter-bored so that the heads of fasteners 706 are located below the plane formed by the outer surfaces of plates 606 and 614. This ensures that thermoelectric chips 622 and 624 can be mounted flush to their respective first plate 606 or fourth plate 614. Additionally, counter-boring ensures that heat sink 626 will be able to completely engage the outer surface of each of thermoelectric chips 622, and that heat sink 628 will be able to completely engage the outer surface of each of thermoelectric chips 624.

Thermoelectric chips 622 and 624 add to the versatility of operation of heat exchanger 600. Depending on the polarity of the electrical power supplied to leads 702 of thermoelectric chips 622, one side of thermoelectric chips 622 will produce heat, while the other side will absorb heat. Thus, the fluid flowing through tube 610 can selectively be heated or cooled. Thermoelectric chips 624 operate in the same manner as thermoelectric chips 622. To operate correctly, electrical power with the same polarity must be supplied to both thermoelectric chips 622 and thermoelectric chips 624. The actual electrical connections are well known to those skilled in the art, and are not shown in the figures so as not to unnecessarily obscure the other features of the invention.

FIG. 7B is a side plan view of heat exchanger 600. Heat exchanger 600 further includes fastener apertures 708. Fastener apertures 708 permit fasteners 630 to pass completely through thermal reservoirs 602 and 604 to secure heat sinks 626 and 628 thereto. Fasteners 708 are thermally isolated (e.g., not touching, insulating bushings, etc.) from thermal reservoirs 602 and 604.

Tube 610 is also shown to include a plurality of straight sections 710. Straight sections 710 travel laterally and parallel to each other through thermal reservoir 602 and second thermal reservoir 604. The primary advantage of encasing only straight sections 710 of tube 610 within thermal reservoirs 602 and 604 is the simplification of the manufacturing process. If only straight sections need to be formed in plates 606, 608, 612, and 614, manufacturing costs of heat exchanger 600 can be lowered, because machining time and or complexity is greatly reduced. It should be understood, however, that thermal reservoirs 602 and 604 may be configured similar to thermal reservoirs 102 and 104 to encase corrugated sections 618 of tube 610. Optionally, the exposed sections of tube 610 can be reinforced (e.g., with heat shrink tubing) in high temperature and/or high pressure applications.

As it exits thermal reservoir 602 near base 616, tube 610 makes a turn (into the plane of the page) in order to enter second thermal reservoir 604. Because tube 610 travels between both thermal reservoir 602 and second thermal reservoir 604, the fluid contained therein is more thoroughly heated and/or cooled. Furthermore, the fluid can be heated/cooled to higher/lower temperatures, because of the extended length of travel within thermal reservoir 602 and second thermal reservoir 604. Further, increasing the length of the thermally active fluid path, allows the rate of flow therethrough to be increased.

The description of particular embodiments of the present invention is now complete. Many of the described features may be substituted, altered or omitted without departing from the scope of the invention. For example, a greater or lesser number of heat exchange sub-units may be employed in various embodiments. As another example, corrugated tubing for use in the present invention can be manufactured from alternate chemically inert materials including, but not limited to, PTFE, FEP, etc. As another example, cooling units can be coupled directly to the thermal reservoirs (omitting thermoelectric chips) to provide a cooling heat exchanger. As yet another example, heating/cooling fluid can be circulated through the fluid conduction tube of one heat exchange sub-unit in order to heat/cool the thermal reservoir of an adjacent heat exchange sub-unit. These and other deviations from the particular embodiments shown will be apparent to those skilled in the art, particularly in view of the foregoing disclosure.

We claim:

1. A heat exchanger, comprising:
    a first plate having a first surface with a tube-receiving channel formed therein;
    a second plate coupled to said first plate, said second plate having a first surface, a second surface, a complementary tube-receiving channel formed in said first surface, and a heater-receiving recess formed in said second surface;
    a tube disposed between said tube-receiving channel of said first plate and said complementary tube-receiving channel of said second plate;
    a third plate coupled to said second plate, said third plate having a first surface, a second surface, a complementary heater-receiving recess formed in said first surface, and a tube-receiving channel formed in said second surface;
    a fourth plate coupled to said third plate, said fourth plate having a complementary tube-receiving channel formed in a first surface thereof; and
    a second tube disposed between said tube-receiving channel of said third plate and said complementary tube-receiving channel of said fourth plate.

2. A heat exchanger according to claim 1, wherein at least one of said tube and said second tube is formed from a plastic.

3. A heat exchanger according to claim 1, wherein at least one of said tube and said second tube id formed from perfluoroalkoxy (PFA) plastic.

4. A heat exchanger according to claim 1, wherein at least one of said tube and said second tube maintains structural integrity at temperatures exceeding 250 degrees Celsius.

5. A heat exchanger according to claim 1, wherein at least one of said tube and said second tube is chemically inert.

6. A heat exchanger according to claim 1, wherein at least one of said tube and said second tube comprises a plurality straight sections and a plurality of corrugated sections.

7. A heat exchanger according to claim 6, wherein said straight sections of said at least one of said tube and said second tube are disposed parallel to one another.

8. A heat exchanger according to claim 7, wherein the spacing between adjacent edges of two of said parallel straight sections of said at least one of said tube and said second tube is less than or equal to 1.5 times the diameter of said at least one of said tube and said second tube.

9. A heat exchanger according claim 1, wherein:
    at least one of said tube receiving channel of said first plate and said tube-receiving channel of said third plate comprises a plurality of straight sections and a plurality of curved sections; and
    an associated one of said complementary tube-receiving channel of said second plate and said tube-receiving channel of said fourth late comprises a plurality of straight sections an a plurality of curved sections.

10. A heat exchanger according to claim 9, wherein:
    at least one of said tube and said second tube have corrugated bends formed therein; and
    said curved sections said tube-receiving channel and said complementary tube-receiving channel associated with said at leas one of said tube and said second tube having corrugated bends have a larger diameter than said straight sections to accept said corrugated bends of said at least one of said tube and said second tube.

11. A heat exchanger according to claim 9, wherein said straight sections of said at least one of said tube-receiving channel and said complementary tube-receiving channel are formed parallel to one another.

12. A heat exchanger according to claim 11, wherein the spacing between two of said parallel straight sections of said at least one of said tube-receiving channel and said complementary tube-receiving channel is less than or equal to 1.5 times the diameter of said at least one tube-receiving channel and said complementary tube-receiving channel.

13. A heat exchanger according to claim 1, wherein said heater-receiving recess of said second plate and said complementary heater-receiving recess of said third plate define a bore between said second plate and said third plate.

14. A heat exchanger according to claim 1, further comprising a cartridge heater disposed between said heater-receiving recess and said complementary heater-receiving recess.

15. A heat exchanger according to claim 1, further comprising a first plurality of thermoelectric chips thermally coupled to a second surface of said first plate.

16. A heat exchanger according to claim 15, further comprising a heat sink coupled to said first plurality of thermoelectric chips.

17. A heat exchanger according to claim 16, wherein said heat sink comprises a cooling plate adapted to facilitate a cooling fluid flowing therethrough.

18. A heat exchanger according to claim 15, further comprising a first plurality of thermoelectric chins in thermal contact with said thermal reservoir, disposed on a side of said first plate opposite of said channel of said first plate; and a second plurality of thermoelectric chips thermally coupled to a second surface of said fourth plate.

19. A heat exchanger according to claim 18, further comprising a heat sink thermally coupled to at least a portion of said first or said second plurality of thermoelectric chips.

20. A heat exchanger according to claim 19, wherein said heat sink comprises at least one cooling vessel, said cooling vessel adapted to facilitate a cooling fluid flowing therethrough.

21. A heat exchanger according to claim 20, wherein said heat sink comprises:
a first cooling vessel coupled to said first plurality of thermoelectric chips; and
second cooling vessel coupled to said second plurality of thermoelectric chips.

22. A heat exchanger according to claim 21, wherein said first cooling vessel is in fluid communication with said second cooling vessel.

23. A heat exchanger according to claim 1, wherein said tube is in fluid communication with said second tube.

24. A heat exchanger according to claim 1, wherein said second plate and said third plate formed integrally as a single plate.

25. A heat exchanger according to claim 1, wherein at least one of said first plate and said fourth plate have a second surface with a heater-receiving recess formed therein.

26. A heat exchanger according to claim 25, further comprising a fifth plate coupled to said at least one of said first plate and said fourth plate, said fifth plate having a first surface, a second surface, a complementary heater-receiving recess formed in said first surface, and a tube-receiving recess formed in said second surface.

27. A heat exchange according to claim 26, further comprising:
a sixth plate coupled to aid fifth plate, said sixth plate having a complementary tube-receiving channel formed in a first surface thereof; and
a third tube disposed between said tube-receiving channel of said fifth plate and said complementary tub receiving channel of said sixth plate.

28. A heat exchange according to claim 26, further comprising:
a first cartridge heater disposed between said heater-receiving recess of said second plate and said complementary heater-receiving recess of said third plate; and
a second cartridge heater disposed between said heater-receiving recess of said at least one of said first plate and said fourth plate and said complementary heater-receiving recess of aid fifth plate.

29. A heat exchanger according to claim 1, wherein said complementary tube-receiving channel of said fourth plate is complementary to said complementary tube-receiving channel of said second plate.

30. A heat exchange according to claim 1, wherein said tube-receiving channel of said third plate is complementary to said complementary tube-receiving channel of said second plate.

31. A heat exchange according to claim 1, wherein said second plate is substantially identical to said third late.

32. A heat exchange according to claim 31, wherein at least one of said first plate and said fourth plate is substantially identical to said third plate.

33. A heat exchanger, comprising:
a thermal reservoir including at least one plate having at least one channel formed therein, said channel having a plurality of straight sections and a plurality of curved sections; and
a tube in thermal contact with at least a portion of said channel, said tube having corrugated bends formed therein; and wherein
said curved sections of id channel have a larger diameter than said straight sections to accept said corrugated bends of said tube.

34. A heat exchange according to claim 33, wherein said straight sections of said channel are formed parallel to one other.

35. A heat exchange according to claim 34, wherein the spacing between two of said parallel straight sections of said channel is less than or equal to 1.5 times the diameter of said channel.

36. A heat exchanger, comprising:
a thermal reservoir including a first plate with at least one channel formed therein and a second plate coupled to said first plate, said second plate having at least one channel complementary to said channel of said first plate formed therein; and
a tube in thermal contact with said thermal reservoir, said tube having corrugated bends formed therein; and wherein
said channel and said complementary channel thermally engage at least a portion of said tube;
said complementary channel of said second plate comprises straight sections and curved section; and
said curved sections of said complementary channel have a larger diameter than said straight sections of said complementary channel to accept said corrugated bends of said tube.

* * * * *

UNITED STATES PATENT AND TRADEMARK OFFICE
CERTIFICATE OF CORRECTION

PATENT NO. : 6,782,195 B2  Page 1 of 1
APPLICATION NO. : 10/116721
DATED : August 24, 2004
INVENTOR(S) : Abras et al.

It is certified that error appears in the above-identified patent and that said Letters Patent is hereby corrected as shown below:

Col. 10, line 36, Claim 3, line 1, delete "claim 1," and insert --claim 2,-- in its place.
Col. 10, line 37, Claim 3, line 2, delete "id" and insert --is-- in its place.
Col. 10, line 44, Claim 6, lines 2 and 3, insert --of-- between "plurality" and "straight".
Col. 10, line 66, Claim 10, line 4, insert --of-- between "sections" and "said".
Col. 11, line 1, Claim 10, line 6, delete "leas" and insert --least-- in its place.
Col. 11, line 33, Claim 18, line 2, delete "chins" and insert --chips-- in its place.
Col. 11, line 57, Claim 24, line 2, insert --are-- between "plate" and "formed".
Col. 12, line 3, Claim 27, line 3, delete "aid" and insert --said-- in its place.
Col. 12, line 17, Claim 28, line 9, delete "aid" and insert --said-- in its place.
Col. 12, line 22, Claim 30, line 1, delete "exchange" and insert --exchanger-- in its place.
Col. 12, line 26, Claim 31, line 1, delete "exchange" and insert --exchanger-- in its place.
Col. 12, line 28, Claim 32, line 1, delete "exchange" and insert --exchanger-- in its place.
Col. 12, line 39, Claim 33, line 9, delete "id" and insert --said-- in its place.
Col. 12, line 42, Claim 34, line 1, delete "exchange" and insert --exchanger-- in its place.
Col. 12, line 44, Claim 34, delete "other" and insert --another-- in its place.
Col. 12, line 45, Claim 35, line 1, delete "exchange" and insert --exchanger-- in its place.

Signed and Sealed this

First Day of August, 2006

JON W. DUDAS
*Director of the United States Patent and Trademark Office*